April 15, 1952 — F. H. HAGNER — 2,593,141
VISUAL CELESTIAL NAVIGATION INSTRUMENT
Filed Nov. 19, 1947 — 3 Sheets-Sheet 1

INVENTOR.
FREDERICK H. HAGNER
BY
HIS ATTY.

April 15, 1952  F. H. HAGNER  2,593,141
VISUAL CELESTIAL NAVIGATION INSTRUMENT
Filed Nov. 19, 1947  3 Sheets-Sheet 2

INVENTOR.
FREDERICK H. HAGNER
BY
HIS ATTY.

April 15, 1952     F. H. HAGNER     2,593,141
VISUAL CELESTIAL NAVIGATION INSTRUMENT
Filed Nov. 19, 1947     3 Sheets-Sheet 3
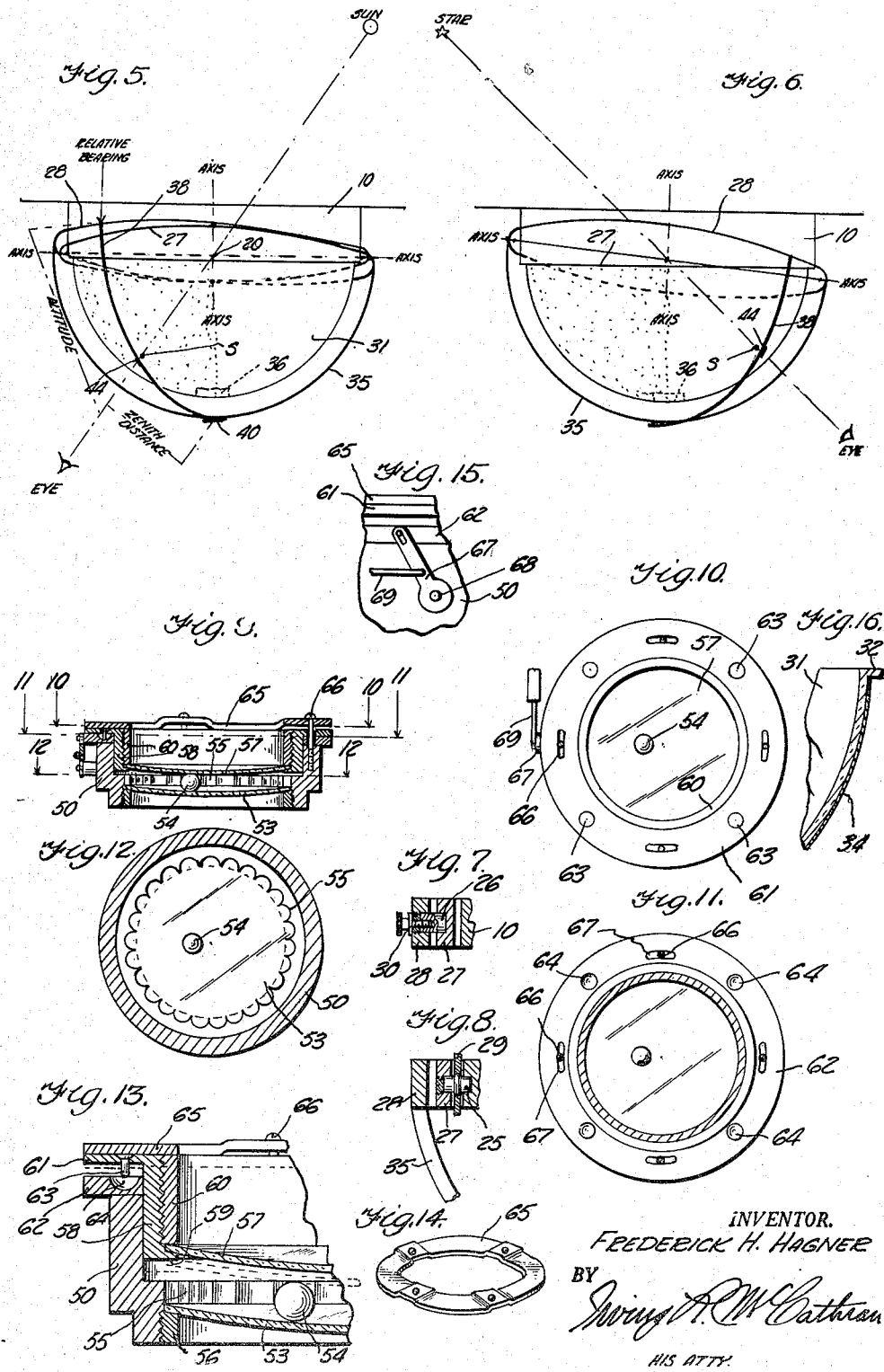
INVENTOR.
FREDERICK H. HAGNER Patented Apr. 15, 1952

2,593,141

UNITED STATES PATENT OFFICE 2,593,141

VISUAL CELESTIAL NAVIGATION INSTRUMENT

Frederick H. Hagner, San Antonio, Tex.

Application November 19, 1947, Serial No. 786,845

6 Claims. (Cl. 33—61)

This invention relates to a visual celestial navigation instrument, and has for one of its objects the production of a simple and efficient instrument for measuring the zenith distance, altitude and relative bearing (azimuth) of a selected celestial body relative to the geographical position of the observer.

A further object of this invention is the production of a visual celestial navigation instrument for measuring the shortest distance between two points on a semisphere representing the horizontal system in nautical astronomy and celestial navigation.

Another object of this invention is the production of a simple and efficient means for recording of the path of a selected celestial body upon a semisphere as the body will be seen by an observer while traveling between two geographical points at a given rate of speed on a known date and time of departure and arrival.

Other objects and advantages of the present invention will appear throughout the following specification and claims.

In the drawings:

Figure 5 is a diagrammatic view of the instrument illustrating one measuring problem;

Figure 6 is another diagrammatic view of the instrument illustrating another measuring problem;

Figure 7 is an enlarged fragmentary sectional view taken on line 7—7 of Figure 3;

Figure 8 is an enlarged fragmentary sectional view taken on line 8—8 of Figure 3;

Figure 9 is a transverse sectional view of the gravity-controlled ball-level indicator;

Figure 10 is a horizontal sectional view taken on line 10—10 of Figure 9;

Figure 11 is a horizontal sectional view taken on line 11—11 of Figure 9;

Figure 12 is a horizontal sectional view taken on line 12—12 of Figure 9;

Figure 13 is an enlarged transverse sectional view through a portion of the ball-level indicator illustrating the manner of locking the ball in a set position;

Figure 14 is a perspective view of the spring ring which is carried by the ball-leveling device;

Figure 15 is an enlarged fragmentary side elevational view of the lever which oscillates the ball-locking and releasing disc of the ball-level indicator or register;

Figure 16 is a fragmentary sectional view of the semisphere illustrating the coating which may be applied to the surface of the semisphere.

Figure 2:
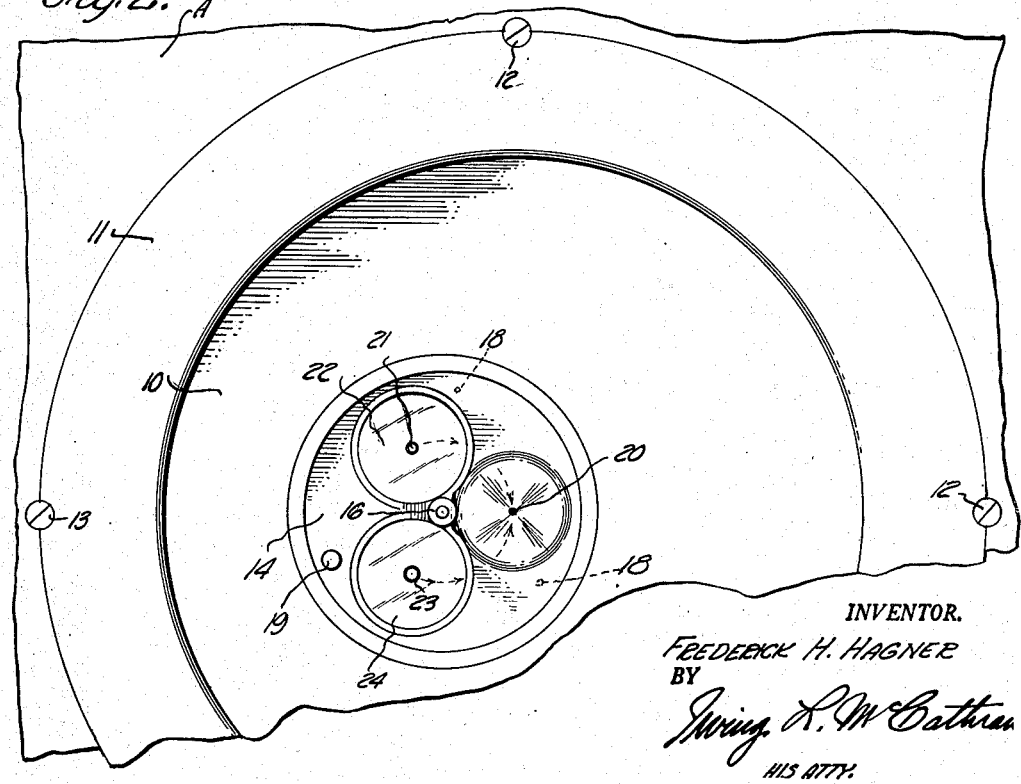
Figure 2 is a fragmentary top plan view of the instrument.
Figure 4:
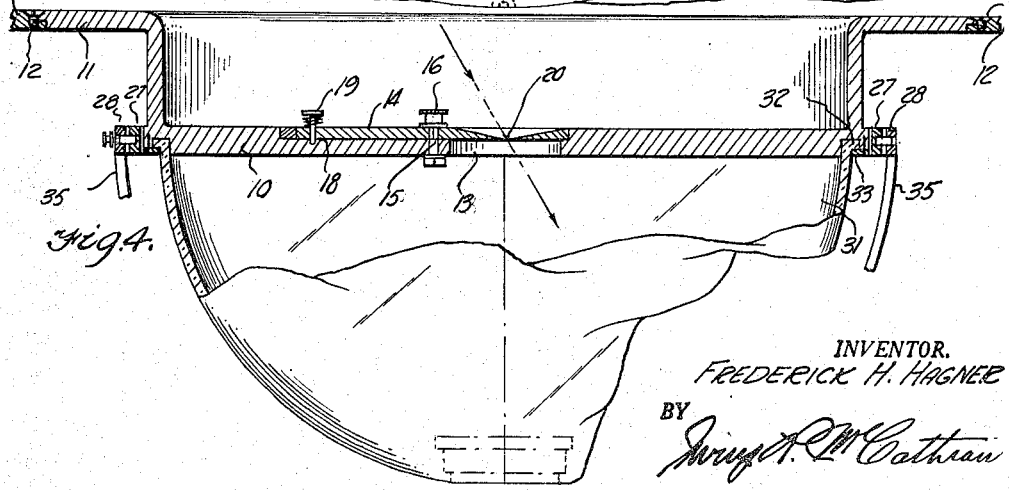
Figure 4 is a central vertical sectional view of the instrument, certain parts being broken away, and the semiphere being shown partly in elevation.

By referring to the drawings, it will be seen that 10 designates a cup-shaped hanger frame, having a supporting flange 11 which is preferably annular and is secured in any desired manner to the top of an airplane A, or other support, such as a ship or the like. Screws 12 may be used to anchor the hanger frame 10 in position in a suspended manner from a suitable support. The frame 10 is provided with a large central aperture 13. An eccentrically mounted light-control circular disc 14 is carried by and fixed to a shaft 15, which shaft 15 is journaled to one side of the center of cup-shaped hanger frame 10, as shown in Figures 2 and 4. A suitable knob 16 is carried by the shaft 15 to facilitate the rotation of the disc 14 within the socket 17 formed in the upper face of the hanger 10. Suitable pin-receiving sockets 18 are formed in the frame 10 below the disc 14 for receiving the spring-pressed lock-pin 19 which is carried by the disc 14 for locking the disc 14 in a selected rotated position and to selectively bring the center of the feather edge aperture 20 of the disc 14, or the center luminous circle 21 of the glass disc 22, or the luminous circle center 23 of the clear glass disc 24, directly over the center of the aperture 13. The center of the feather edge aperture 20 and the bottom edge of the disc 14 are aligned with gimbal pins 25 which are carried by the frame 10 and the gimbal pins 26 when the gimbal rings 27 and 28 are in alignment. The disc 14 may be rotated to bring the center 20, 21 or 23 to a central position over the center of the aperture 13. The opening 20 is used when using the sun as a sighting body, the luminous circle 21 when using a star as a sighting body, and the center 23 of the disc 24 when using the moon as a sighting body. The pin 19 will lock the disc 14 in the desired selected position As shown, and also as noted above, the rings 27 and 28 are mounted in gimbals of any suitable construction, and one of the pins 25 carries a threaded nut 29 to lock the ring 27 in a set or locked position when desired. Any type of locking means may be provided to lock the rings 27 and 28 in a set position, without departing from the spirit of the invention.

Figure 3:
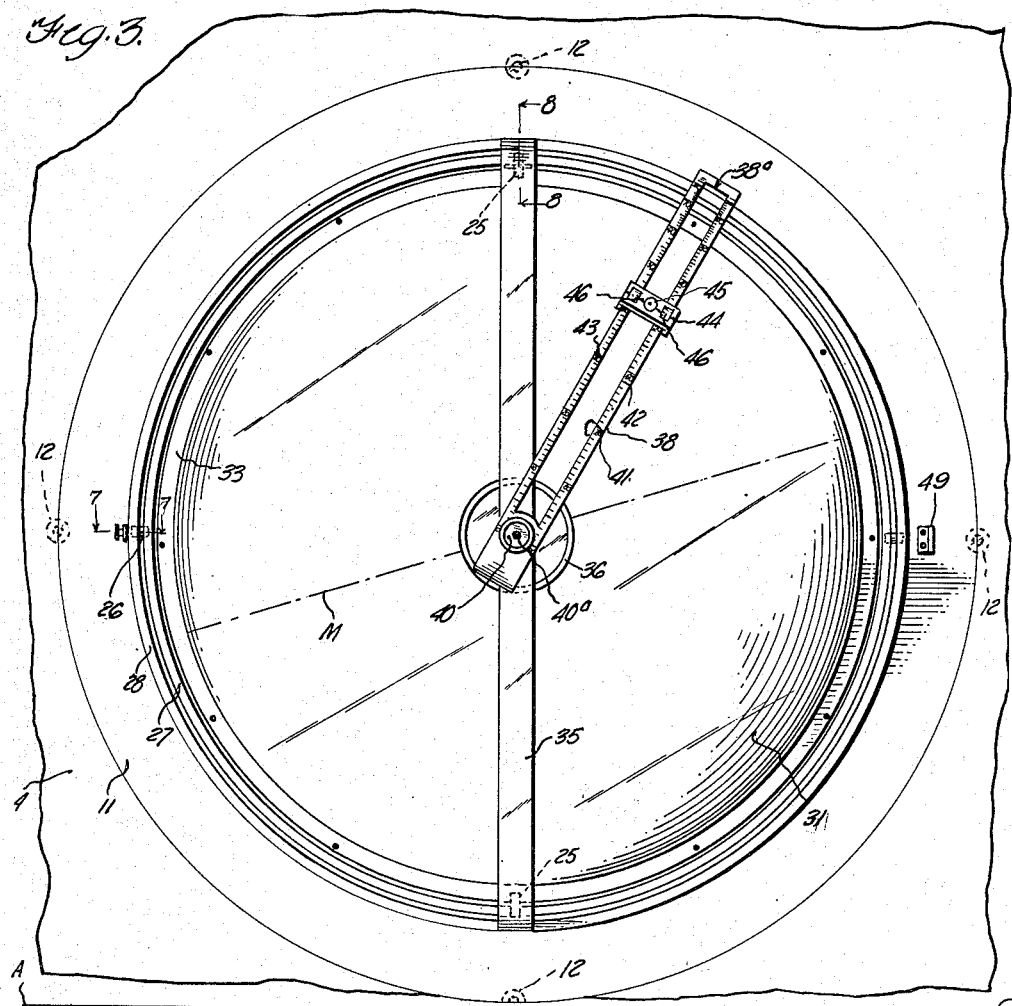
Figure 3 is a bottom plan view of the instrument.

A transparent semisphere 31 is suspended from the bottom of the hanger 10 and is provided with a lateral annular flange 32 to support and also to permit rotation of the semisphere 31 upon the hanger 10. The gimbal ring 27 is pivoted to the hanger 10 by pins 25, and the gimbal ring 28 is pivoted to the ring 27 by the pins 26, the pins 26 being located at right-angles to the pins 25, as shown in Figure 3. The semisphere 31 is fastened to the hanger frame 10 by means of a retaining ring plate 33. The semisphere 31 preferably is formed of plastic, clear glass, or other transparent material for use in sighting stars, and may be coated with a translucent coating of a suitable type 34 in a manner as shown in Figure 16, when sighting the sun. The coating 34 on semisphere 31 may be in the nature of a photographic emulsion to photograph the path of the observed or sighting celestial body during an observer's flight from point of departure to point of destination in somewhat the same manner as set forth in my Patent #2,205,357, issued June 18, 1940, upon a Visual Course and Position Indicator.

Figure 1:
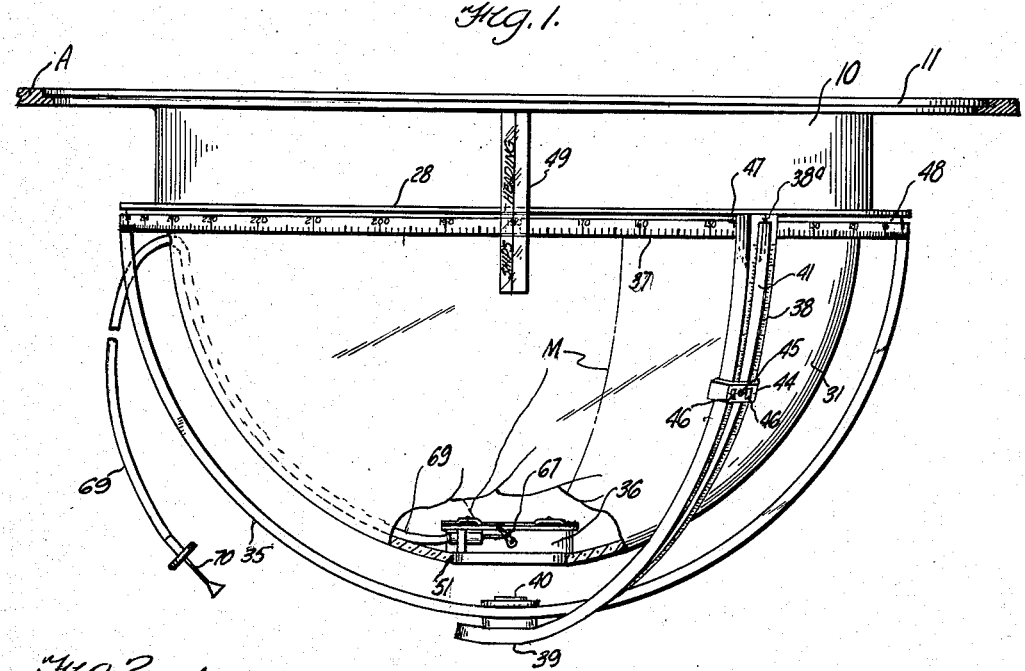
Figure 1 is a side elevational view of the instrument with a part of the semiphere broken away.

A semi-circular 180° arc or hanger band 35 is suspended from the outer azimuth ring 28 and extends circumferentially across the center of the semisphere 31, as shown in Figure 3. A transparent gravity-controlled level indicator or register 36 is carried within the bottom of the semisphere 31. at its central point, as shown in Figure 1, directly below the aperture 13 of the hanger 10. The outer ring 28 is provided with a 360° azimuth scale 37 upon its outer face, as shown in Figure 1. A 90° altitude arc 38 is pivoted at a central point intermediate the ends of the hanger band by means of a bearing 39 and a transparent viewing glass 40 is passed centrally through the bearing 39 so as to view the ball level-registering device 36, see Figure 1. The arc 38 is provided with a longitudinal slot 41 and carries a pair of parallel scales 42 and 43, the scale 42 being marked 0 to 90° from the pivot 39 to the outer end and the scale 43 reading 90° to 0, or reverse relative to the scale 42. An index slide 44 is slidable longitudinally of the arc 38 and has a central reading glass or lens 45 having a central sighting point overlying the slot 41. Scale-sighting slots 46 are formed in the slide 44 overlying the scales 42 and 43 to facilitate reading of these scales. The slide 44 may be moved so as to underlie the viewing glass 40 when viewing the ball level register. As shown in Figure 1, the upper end of the arc 38 is provided with an inturned tongue 47 which travels in the channel 48 formed in the outer face of the ring 28 above the scale 37, to hold the parts together. A ship's heading indicator 49 is suspended from the hanger frame flange 11 in a manner to clear the arc 38, as the arc 38 is swung. The hanger band 35 is formed of transparent plastic material.

The gravity-controlled ball-level indicator or register 36 comprises a casing 50 which is secured within the bottom aperture 51 of the semisphere 31. The casing 50 is provided with a central aperture 52 in which is securely fitted a glass plate 53, preferably in the nature of a segment of ground glass, to a curvature of a nine-inch radius. A one-eighth inch steel ball 54 rests upon the glass plate 53 and the casing 50 is provided with a plurality of scallops 55 around the outer edge of the glass plate 53, which serve to keep the ball 54 from rolling around the outer edge of the edge of the plate 53. These scallops 55 overlie the edge of the plate 53, and the retaining ring 56 is threaded into the casing 50 to retain the plate 53, as shown in detail in Figure 13. Over the ball 54 a second ground glass plate 57 is carried by a vertically movable collar 58. This plate 57 is preferably convex with a radius of curvature of eight and seven-eighths inches.

The plate 57 is clamped upon the collar 58 between the inwardly extending flange 59 and the threaded ring 60. The collar 58 is provided with a laterally-extending annular flange 61, and a rotatable flat ring 62 is interposed between the flange 61 and the upper end of the casing 50, as shown in detail in Figure 13. Depending lugs 63 are carried by the flange 61 and normally fit within the concave sockets 64 which are formed in the upper face of the ring 62. The lugs 63 are adapted to lift the flange 61 as the ring 62 is rotated in one direction, thereby causing the lugs 61 to ride up out of the sockets 64 and contact the upper surface of the ring 62. This movement will lift the glass 57 out of contact with the ball 54 and allow the ball 54 to freely roll upon the plate 53 under the pull of gravity. A spring pressure ring 65 presses downwardly upon the flange 61 and is anchored in position by means of the anchoring screws 66 which pass through the ring 65, the elongated slots 67 of the ring 62, and are threaded into the upper end of the casing 50. As the ring 62 is rotated in the opposite direction, the lugs 63 will fall into the sockets 64 and the pressure of the spring ring 65 will force the collar 58 downwardly and cause the glass 57 to instantaneously clamp the ball 54 against the plate 53 and lock the ball 54 in a set position to register the direction and degree of tilt of the instrument.

For the purpose of oscillating the ring 62 to lock and release the ball 54 as described above, I provide a pivoted lever 67 which is mounted upon the casing 50, as at 68, and is pivotally connected at its opposite end to the periphery of the ring 62. A remote control flexible cable 69 is connected to the lever 67 and carries a push-button 70 at its opposite end. The flexible cable 69 is of the conventional type illustrated and passes along the inner face of the semisphere 31 and out through a suitable opening near the upper edge thereof. The free end of the cable 69 which carries the push-button 70 hangs down to a convenient point where it is in easy reach of an operator.

It is well-known that a knowledge of three systems is required for understanding of nautical astronomy and celestial navigation, for instance:

1. The horizon system of altitude and azimuth is used to make observations and every observation made in nautical astronomy and celestial navigation depends upon some means of obtaining the zenith point.

2. The geographic system where latitude and longitude refer to points upon the earth, the equator and through the longitude of Greenwich.

3. The equinoctial system where declination and Greenwich hour angle refer to points of the celestial sphere, the celestial equator, and the meridian of Greenwich. Hence the declination and Greenwich hour angle of a star (for example) in zenith, is the latitude and longitude of the place of observation.

The instrument illustrated and described in this application constitutes a reproduction in miniature of the entire horizon system. It is possible with this instrument to measure the zenith distance and azimuth relative bearing of a selected visible celestial body.

With this instrument it is possible to keep a continuous sight on a selected visible celestial body and to record the path of travel of said body from the time the body first appears on the horizon in the east until said body disappears below the western horizon. By utilizing the number 214 or 218 altitude and azimuth table published by the Hydrographic Office, a precomputed curve may be readily drawn on the semisphere 31.

It should be noted that the semisphere 31 preferably may be of one half clear glass for observing stars, and the other half may be covered with a suitable frosting coating for observing the sun. A ray of light from the sun is cast through the feather edge aperture 20 and causes a small spot of light to be cast upon the frosted portion of the semisphere 31. Accurately fitted gimbals are mounted so that the opening 20 and the gimbals are located at the geometrical center of the instrument. The arc or band 35 represents the observer's meridian. In the center of this arc, which represents the zenith, is mounted a lens or glass 40 which is focused to the center of the ball 54. The 90° altitude arc 38 is connected to the outer ring 28 and is pivoted at the point on arc 35 where the glass 40 is mounted. An index slide 44 is slidable over the arc 38 and scales 42 and 43, and is also movable to register with the center mark 40ª of the glass 40 when viewing the center of the ball 54 to measure the direction and degree of tilt of the instrument when making an observation. It should also be noted that the centers 21 or 23 may be brought into position to register with the center of the instrument in place of the aperture 20 when viewing celestial bodies other than the sun.

To facilitate the understanding of the operation of the instrument, reference may be made to the diagrammatic views of Figures 5 and 6.

The operation is as follows:

1. The pilot steers a compass course and a ray of light from the sun passes through the aperture 20 and is cast at S on the semisphere 31 in Figure 5. The pilot notes his time and stops the ball 54 in the level indicator 36 by operating the push-button 70 to clamp the plate 57 against the ball 54 at the moment when the sun spot S is steady or at rest upon the semisphere 31. The pilot places a pencil point mark on the semisphere where the sun spot appears. He then moves the glass 40 so that the small circle 40ª is directly under the ball 54 which represents the zenith point from which measurement is made. He then locks the gimbals 25 and 26 and moves the arc 38 and index slide 44 in columniation with the mark on the semisphere 31. The reading on the azimuth scale 37 gives the relative bearing (azimuth) at the point where the arrow 38ª registers with the azimuth scale i. e. (220°). The position of the center of the index slide 44 relative to the azimuth ring 28 and scale 42 i. e. (65°) will give the altitude of the observed body and the position of the index slide 44 on the arc 38 relative to the scale 43 i. e. (25°) will give the zenith distance of the observed body measuring from the circle 40ª of the glass 40 to index 44.

By using the clear glass on the semisphere 31, and selectively rotating the disc 14 to bring the central points 21 or 23 into proper central position measurements may be made in the same manner while observing other celestial bodies at night, see Figure 6 for example.

A frosting solution may be placed upon the semisphere 31 for the observation of the sun, and the clear surface may be used for other observations in which event a pencil having a luminous stylus for placing a luminous mark on the globe may be used. Also a photographic emulsion or material may be placed on the semisphere.

The curvature of the glass plates 53 and 57 must be approximately of the same curvature or radius as the semisphere 31 to obtain accurate measurement.

The bowl-like member or semisphere 31 may be made entirely of clear glass if desired for use in taking an observation from the stars or moon, and the entire surface of the semisphere 31 may be coated with a frosting compound or a photographic emulsion if it is so desired, in place of coating only one half or a segment thereof. A line M to indicate the observer's local meridian, is preferably etched upon the semisphere 31 to divide the heavens into an eastern and a western half when the line M registers with 360° line on the azimuth scale 37.

The conventional magnetic and gyro compasses may be corrected for variation and deviation at the observer's location on the earth. This is accomplished by marking a series of points on the semisphere 31 which represent positions of a selected celestial body in the heavens at given intervals of time. Then by heading the plane or ship in azimuth (ship being level at time of observation) the ray of light passing through aperture 20 and cast upon the globe or semisphere 31 and registering with these marks at the calculated time, the 360° line on the azimuth scale 37 will represent true north. By comparing the ship's heading 49 relative to the scale 37 with the heading on the compasses at the time of observation, the error, if any, is visible. For instance, the reading on scale 37 is ship's heading 360° and at that time the magnetic compass may read ship's heading 5°, making a difference of 5° error in an easterly direction.

The spots or circles 21 and 23 may be placed upon the under faces of the members 22 and 24 so as to be in line with the bearings of the gimbal rings.

Having described the invention, what is claimed is:

1. A visual celestial navigation instrument comprising a support having a light-receiving opening through which a ray of light from a celestial body is adapted to pass, gimbal rings secured to said support, a hanger band suspended from one of said rings, an azimuth scale carried by one of the rings, an altitude and zenith distance arc pivoted to the hanger band centrally of the ends of said band and extending to the azimuth scale, an index adjustable longitudinally of the arc, a transparent semisphere carried by the support upon which a light spot from a celestial body is adapted to be cast after passing through said light-receiving opening, said arc and index being adjustable to register with said light spot on said semisphere, and a scale carried by said arc to measure the distance on said arc between the index and the azimuth scale to give the altitude of the observed body and to measure the distance between the index and the pivot of the arc to give the zenith distance, the position of the arc relative to the azimuth scale indicating the relative bearing of the observer.

2. A visual celestial navigation instrument comprising a support having a light-receiving opening through which a ray of light from a celestial body is adapted to pass, gimbal rings secured to said support, a hanger band suspended from one of said rings, an azimuth scale carried by one of the rings, an altitude and zenith distance arc pivoted to the hanger band centrally of the ends of said band and extending to the azimuth scale, an index adjustable longitudinally of the arc, a transparent semisphere carried by the support upon which a light spot from a celestial body is adapted to be cast after passing through said light-receiving opening, means for locking said gimbal rings, said arc and index being adjustable to register with said light spot on said semisphere, and a scale carried by said arc to measure the distance on said arc between the index and the azimuth scale to give the altitude of the observed body and to measure the distance between the index and the pivot of the arc to give the zenith distance, the position of the arc relative to the azimuth scale indicating the relative bearing of the observer.

3. A visual celestial navigation instrument comprising a support having a light-receiving opening through which a ray of light from a celestial body is adapted to pass, gimbal rings secured to said support, a hanger band suspended from one of said rings, an azimuth scale carried by one of the rings, an altitude and zenith distance arc pivoted to the hanger band centrally of the ends of said band and extending to the azimuth scale, an index adjustable longitudinally of the arc, a transparent semisphere carried by the support upon which a light spot from a celestial body is adapted to be cast after passing through said light-receiving opening, said arc and index being adjustable to register with said light spot on said semisphere, a scale carried by said arc to measure the distance on said arc between the index and the azimuth scale to give the altitude of the observed body and to measure the distance between the index and the pivot of the arc to give the zenith distance, the position of the arc relative to the azimuth scale indicating the relative bearing of the observer, a gravity-controlled level indicator carried by the semisphere, means for locking the indicator instantaneously at the time of observation to register the direction and degree of tilt of the instrument at the time of observation, a second index means carried by the arc at its pivot movable with the pivot of the arc into registration with the indicator, and means for locking the gimbals to facilitate accurate measurement of the position of the spot of light on said semisphere.

4. An instrument of the class described comprising a support, a transparent bowl-like member carried by the support and upon which a spot of light from a celestial body is adapted to be cast, an azimuth ring having an azimuth scale universally mounted upon the support and surrounding the bowl-like member, a suspension band hung from the azimuth ring, an altitude and zenith distance arc, a pivot securing one end of the arc to the band centrally between the ends of the band, a reading glass extending through the pivot, an index on said reading glass, and a level carried by the bowl-like member, the reading glass at said pivot being movable to bring the index on said glass into registration with the level, an index slidable upon said altitude and zenith distance arc to register with a spot of light cast on said bowl-like member, and a scale on the arc to measure the position of the last-mentioned index relative to the arc.

5. An instrument of the class described comprising a support, a transparent bowl-like member carried by the support and upon which a spot of light from a celestial body is adapted to be cast, an azimuth ring having an azimuth scale universally mounted upon the support and surrounding the bowl-like member, a suspension band hung from the azimuth ring, an altitude and zenith distance arc, a pivot securing one end of the arc to the band centrally between the ends of the band, a reading glass extending through the pivot, an index on said reading glass, a level carried by the bowl-like member, the reading glass at said pivot being movable to bring the index on said glass into registration with the level, an index slidable upon said altitude and zenith distance arc to register with a spot of light cast on said bowl-like member, a scale on the arc to measure the position of the last-mentioned index relative to the arc, and said arc extending in registering relation with said azimuth scale to indicate the relative bearing from the observer's heading.

6. An instrument of the class described comprising a support, a transparent bowl-like member carried by the support and upon which a spot of light from a celestial body is adapted to be cast, an azimuth ring having an azimuth scale universally mounted upon the support and surrounding the bowl-like member, a suspension band hung from the azimuth ring, an altitude and zenith distance arc, a pivot securing one end of the arc to the band centrally between the ends of the band, a reading glass extending through the pivot, an index on said reading glass, a level carried by the bowl-like member, said level comprising a casing, a gravity-controlled ball freely movable in said casing, means for stopping said ball to register its position in said casing, and a remote control means for actuating said last-mentioned means, the reading glass at said pivot being movable to bring the index on said glass into registration columniation with the level, an index slidable upon said altitude and zenith distance arc to register with a spot of light cast on said bowl-like member, and a scale on the arc to measure the position of the last-mentioned index relative to the arc.

FREDERICK H. HAGNER.

REFERENCES CITED

The following references are of record in the file of this patent:

UNITED STATES PATENTS

| Number | Name | Date |
|---|---|---|
| 20,506 | Oakes | June 8, 1858 |
| 494,128 | Decker | Mar. 28, 1893 |
| 1,949,403 | Ashlock | Mar. 6, 1934 |
| 2,064,061 | Hagner | Dec. 15, 1936 |
| 2,205,357 | Hagner | June 18, 1940 |
| 2,389,851 | Hagner | Nov. 27, 1945 |
| 2,402,395 | Hagner | June 18, 1946 |
| 2,411,425 | Hagner | Nov. 19, 1946 |